United States Patent
Cheng et al.

(10) Patent No.: US 9,430,282 B1
(45) Date of Patent: Aug. 30, 2016

(54) SCHEDULING MULTIPLE TASKS IN DISTRIBUTED COMPUTING SYSTEM TO AVOID RESULT WRITING CONFLICTS

(71) Applicant: Marvell International Ltd., Hamilton (BM)

(72) Inventors: Chuang-Yu Cheng, New Taipei (TW); Chih-Hao Chang, Taichung (TW); Yi-Hsiu Hsu, Hsinchu (TW)

(73) Assignee: MARVELL INTERNATIONAL, LTD., Hamilton (BM)

( * ) Notice: Subject to any disclaimer, the term of this patent is extended or adjusted under 35 U.S.C. 154(b) by 352 days.

(21) Appl. No.: 14/042,917

(22) Filed: Oct. 1, 2013

Related U.S. Application Data

(60) Provisional application No. 61/708,882, filed on Oct. 2, 2012.

(51) Int. Cl.

| | | |
|---|---|---|
| *G06F 9/46* | (2006.01) | |
| *G06F 9/50* | (2006.01) | |
| *G06F 9/48* | (2006.01) | |
| G06F 12/10 | (2016.01) | |
| G06F 11/14 | (2006.01) | |
| H04L 29/08 | (2006.01) | |
| G06F 11/30 | (2006.01) | |

(52) U.S. Cl.
CPC ........... *G06F 9/4881* (2013.01); *G06F 11/141* (2013.01); *G06F 9/5016* (2013.01); *G06F 9/5066* (2013.01); *G06F 11/1448* (2013.01); *G06F 11/1461* (2013.01); *G06F 11/3006* (2013.01); *G06F 12/10* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2007/0209036 A1* | 9/2007 | Hinkley | ................. | G06F 9/541 718/102 |
| 2008/0028405 A1* | 1/2008 | Martin | .................... | G06F 9/505 718/102 |
| 2008/0235497 A1* | 9/2008 | Tomblin | .............. | G06F 17/5068 712/225 |
| 2009/0182980 A1* | 7/2009 | Raghavareddy | ........ | G06F 9/321 712/202 |
| 2009/0320075 A1* | 12/2009 | Marko | ................... | H04H 20/40 725/56 |
| 2010/0123717 A1* | 5/2010 | Jiao | ........................ | G06T 15/005 345/426 |
| 2011/0099335 A1* | 4/2011 | Scott | ................... | G06F 12/0842 711/141 |
| 2011/0276539 A1* | 11/2011 | Thiam | ................. | G06F 11/1448 707/634 |
| 2013/0060742 A1* | 3/2013 | Chang | ............... | G06F 17/30359 707/704 |
| 2013/0117752 A1* | 5/2013 | Li | ......................... | G06F 9/5066 718/102 |

* cited by examiner

*Primary Examiner* — Abu Ghaffari

(57) ABSTRACT

Systems and methods are provided for processing a computing task divided into a plurality of discrete tasks using a plurality of data processors. The system includes a system memory having memory space for storing results from processed discrete tasks. The system further includes a plurality of data processors of differing types, a first data processor writing results to the system memory in a first format that is different from a second format that a second data processor uses to write results to the system memory. Further, a scheduler is configured to assign a first set of discrete tasks to the first data processor and a second set of discrete tasks to the second data processor so that a results writing conflict where the second data processor writes results to the system memory that overwrite results written to the system memory by the first data processor is avoided.

12 Claims, 15 Drawing Sheets

Work to dispatch :
1. How many bytes to write
   180 * 4 B = 720 B
2. LCM( CPU Cache Line Size, GPU Cache Line Size ) =
   LCM(32, 64) = 64 B
3. How bigger a sub-group :
   64 B / 4 B (a write size) = 16
4. How many sub-groups
   180 / 16 = 11.25
5. Dispatch half of groups into CPU, and half of groups into GPU =>
   11/2 = 5.5, so dispatch 5 groups to CPU, others to GPU
6. so CPU have : 5 * 16 (a sub-group size) = 80 sub-works
   GPU have 100 sub-works

FIG. 10

SCHEDULING MULTIPLE TASKS IN DISTRIBUTED COMPUTING SYSTEM TO AVOID RESULT WRITING CONFLICTS

CROSS-REFERENCE TO RELATED APPLICATIONS

This application claims priority to U.S. Provisional Patent Application No. 61/708,882, filed Oct. 2, 2012, which is herein incorporated in its entirety.

FIELD

The technology described herein relates generally to distributed computing and more particularly to distributed computing memory management.

BACKGROUND

In a distributed computing environment (or system), multiple data processors are generally configured to work together toward achieving a common goal, such as solving a large computational problem. In such a system, a large computational problem is typically broken into units of work which are respectively assigned to individual data processors. The individual data processors process units of work and respectively return corresponding units of results, where the units of results are used to determine a solution to the larger computational problem.

SUMMARY

Examples of systems and methods are provided for processing a computing task divided into a plurality of work units using a plurality of data processors. In general, in one aspect, this specification discloses a system that includes a system memory having memory space for storing results from processed work units. The system further includes a plurality of data processors of differing types, each data processor being configured to process work units and write results to the system memory, a first data processor writing results to the system memory in a first format that is different from a second format that a second data processor uses to write results to the system memory. Further, a scheduler is configured to assign a first set of work units to the first data processor and a second set of work units to the second data processor so that a results writing conflict where the second data processor writes results to the system memory that overwrite results written to the system memory by the first data processor is avoided.

In general, in another aspect, this specification discloses a computer-implemented method of distributing a computing task divided into a plurality of work units to multiple data processors includes a step of identifying a plurality of work units of a computing task to be distributed among a plurality of data processors, each of the data processors being configured to process work units and write results to a results writing portion of a system memory, the first data processor being configured to write results in a first format that is different from a second format that the second data processor is configured to use to write results to the system memory. A first set of work units is assigned to the first data processor and a second set of work units is assigned to the second data processor so that a results writing conflict where the second data processor writes results to the system memory that overwrite results written to the system memory by the first data processor is avoided.

BRIEF DESCRIPTION OF THE DRAWINGS

FIGS. 9-12 depict an example implementation of a scheduler for assigning work units to avoid a results writing conflict.

DETAILED DESCRIPTION

Figure 1:
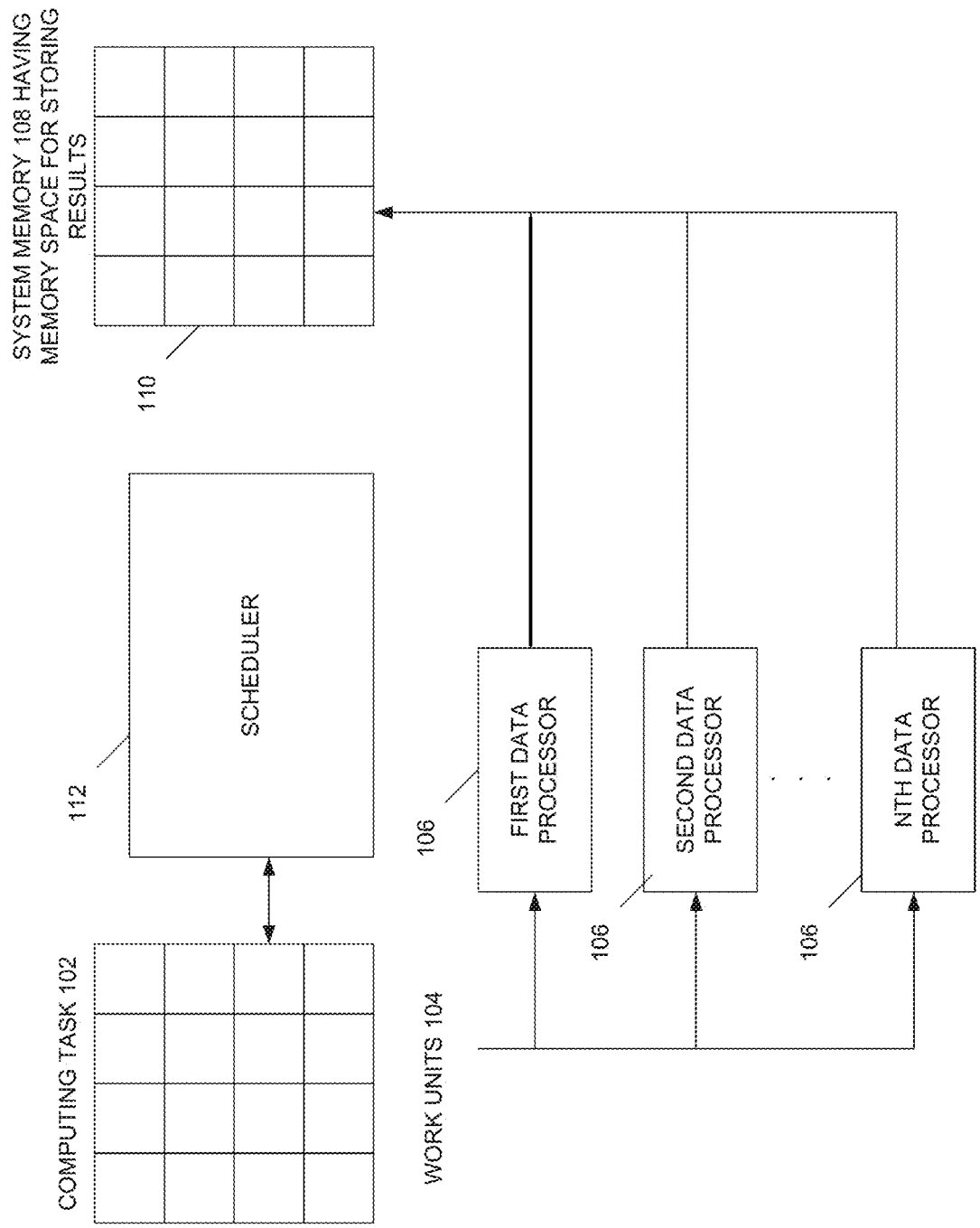
FIG. 1 is a block diagram depicting a distributed computing system including a plurality of data processors for processing a computing task divided into a plurality of work units.

FIG. 1 is a block diagram depicting a system including a plurality of discrete data processors 106, a system memory 108, and a scheduler 112, for processing a computing task 102. In one embodiment, the computing task 102 is divided into a plurality of discrete tasks, which are referred to herein as "work units 104", and each work unit 104 is solved by one or more of the plurality of data processors 106. As shown in FIG. 1, N data processors 106 ("masters") cooperate to concurrently solve the computing task 102. In one embodiment, all of the data processors 106 share the system memory 108, which further includes memory space 110 for storing results related to solving the computing task 102. The scheduler 112 is configured to respectively assign one or more of the work units 104 to the data processors 106. Each data processor 106 respectively processes a work unit 104 assigned to the data processor, which work unit represents a portion of the computing task 102, and writes a result of the processed work unit to the memory space 110.

In one embodiment, certain of the data processors 106 are of differing types from one another. In such an embodiment, the data processors 104 collectively can be referred to a heterogeneous collection of data processors. For example, while each of the data processors 106 respectively includes a local processor memory (not shown) for storing intermediate results prior to writing those results to the system memory 108, the data processors 106 may have local processor memories of differing types, in which each type of processor memory may have a disparate configuration relative to that of another type of processor memory. For example, the data processors 106 may respectively have local processor memories (which are also referred to herein as "local buffers") of different sizes that transmit different amounts of data to the system memory 108 at a time. If such differences are not considered in assigning work units 104 to the data processors 106, such idiosyncrasies in the operation of the data processors 106 can result in errors in solving the computing task 102, such as one data processor overwriting results of other data processors with indeterminate data as described in further detail herein. To ensure that the data processors 106 of differing types properly write results to the system memory 108 without introducing errors into the solving of the computing task 102, the scheduler 112 is configured to assign work units 104 to the data processors 106 so that results writing conflicts are avoided—e.g., so that good results are not overwritten by undefined data.

FIGS. 2-5 depict an example in which processing of a computing task by a first data processor and a second data processor results in an error due to a conflict between the differing manners in which a first data processor writes a result to a system memory relative to how a second data processor writes a result to the system memory, such that good results written by the first data processor are overwritten by undefined data from the second data processor.

Figure 2:
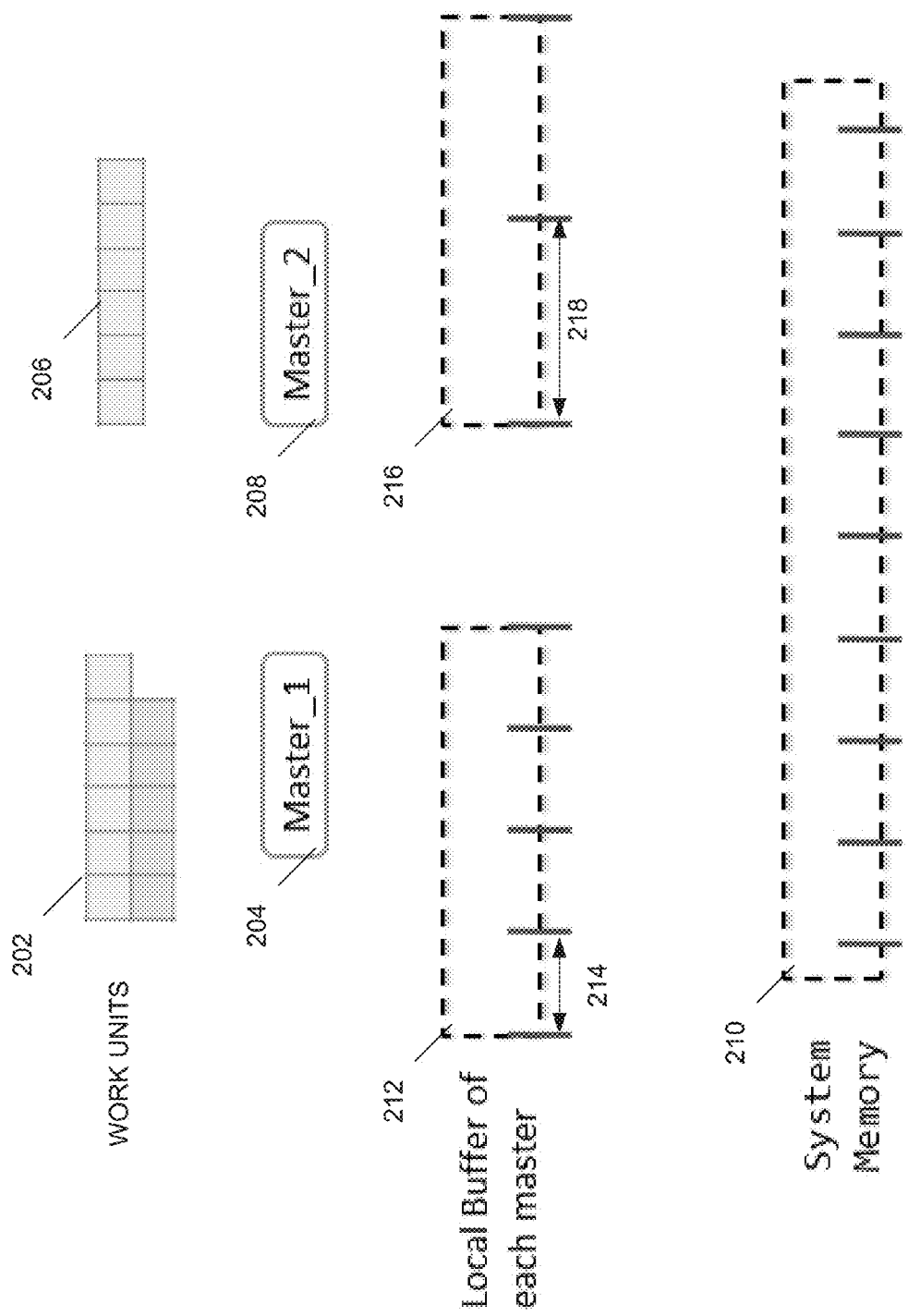
FIGS. 2-5 depict an example computing task computation where a results writing conflict introduces an error.

In FIG. 2, a first set of work units 202 is assigned to a first data processor 204 (Master_1) for processing by the first data processor 204, and a second set of work units 206 is assigned to a second data processor 208 (Master_2) for processing by the second data processor 208. In one embodiment, the work units 202, 206 form a set of contiguous work units, such that, in the portion of system memory 210 shown in FIGS. 2-5, results from processing of the last work unit of the first set of work units 202 should be immediately followed by results from processing of the first work unit of the second set of work units 206. The first data processor 204 and the second data processor 208 are configured to respectively process the work units 202, 206 and write corresponding results to the system memory 210 shared by first data processor 204 and the second data processor 208. The first data processor 204 includes a first local buffer (or processor memory) 212 for temporarily storing calculation results prior to those results being transmitted to the system memory 210. The first local buffer 212 is configured to, for each write to the system memory 210, write a block of data 214 having a first size. The second data processor 208 includes a second local buffer 216 for temporarily storing calculation results prior to those results being transmitted to the system memory 210. The second local buffer 216 is configured to, for each write to the system memory 210, write a block of data 218 having a second size, where the second-sized block of data 218 differs in size from the first-sized block of data 214. For example, in one embodiment, the first local buffer 212 comprises a first cache memory that is configured to write one cache line 214 at a time to the system memory 210, and the second local buffer 216 comprises a second cache memory that is configured to write two cache lines 218 at a time to the system memory.

Figure 3:
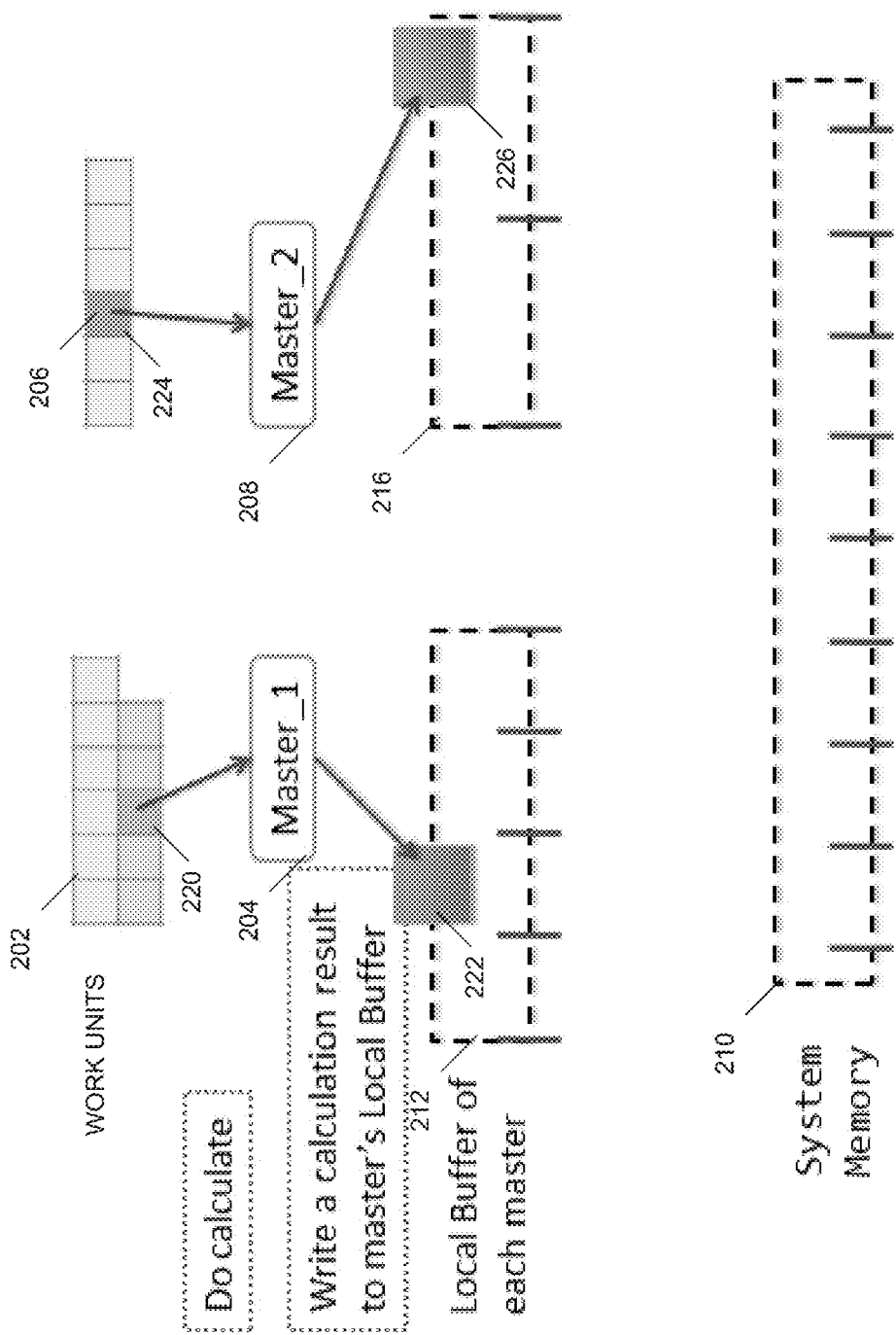

In FIG. 3, each of the data processors 204, 208 begins processing assigned work units 202, 206. The first data processor 204 accesses a work unit 220 and processes the work unit 220 to generate a result 222. The result 222 is temporarily stored in the local buffer 212 of the first data processor 204 as one cache line of data prior to being forwarded to the system memory 210. Similarly, the second data processor 208 accesses a work unit 224 and processes the second work unit 224 to generate a result 226. The result 226 is temporarily stored in the local buffer 216 of the second data processor 208 as one cache line of data prior to being forwarded to the system memory 210.

Figure 4:
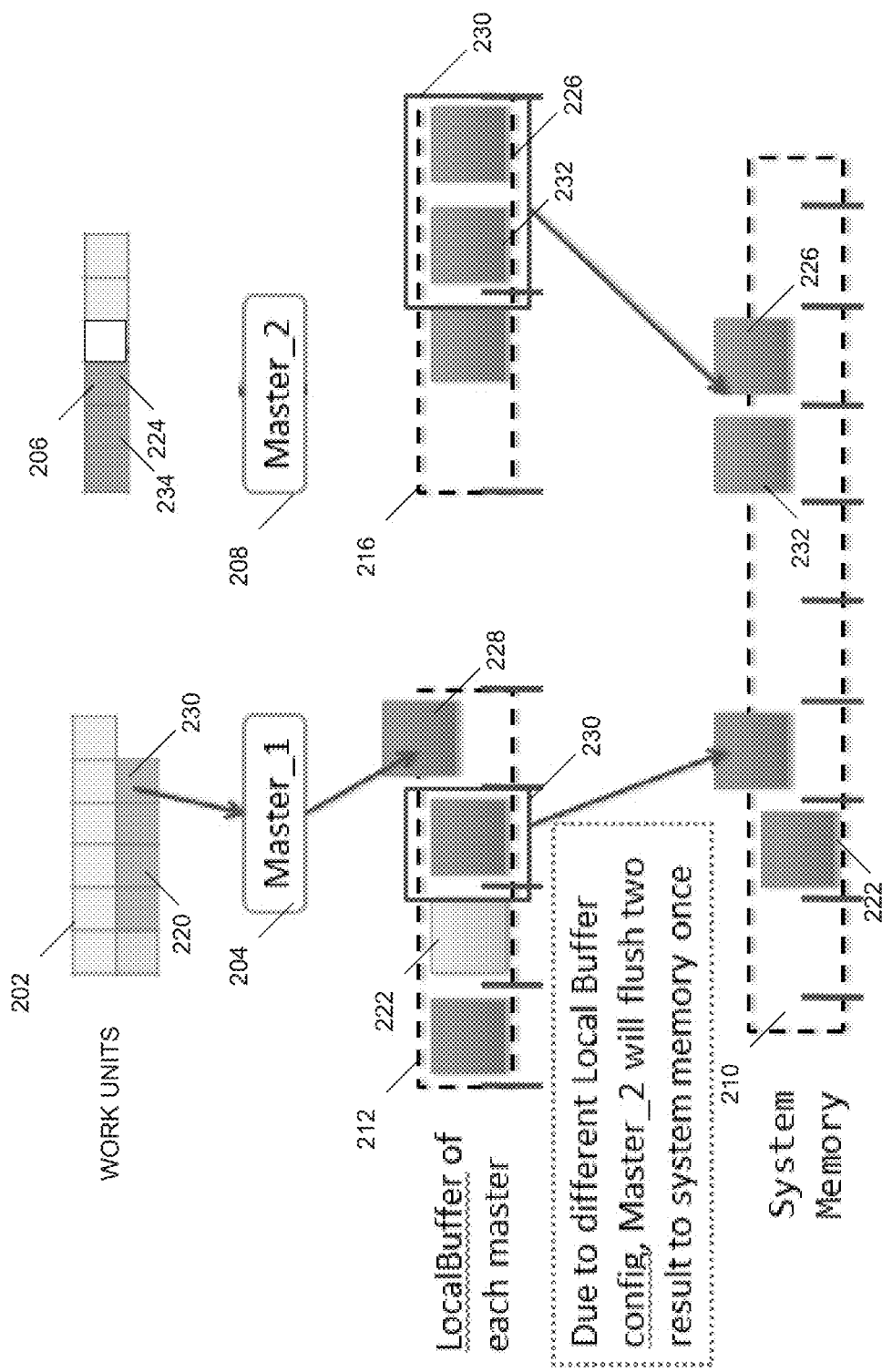

The data processors 204, 208 continue to access work units 202, 206 and process those work units 202, 206 to generate results, as shown in FIG. 4, with an order of results maintained in the local buffers 212, 216 that is commensurate with the order of work units 202, 206 assigned (i.e., the result 228 for work unit 230 is positioned two positions after the result 222 for work unit 220). As blocks of data are filled (i.e., blocks of one cache line in size for the first local buffer 212 and blocks of two cache lines in size for the second local buffer 216), those blocks of data are written to the system memory. For example, the result at 226 originating from a work unit at 224 is written to the system memory 210 along with a result 232 from a preceding work unit 234. The results are written to the system memory 210 so as to maintain the relative ordering of results with respect to the ordering of the assigned work units 202, 206. Once results have been flushed (or forwarded) to the system memory 210, the results in the local buffers 212, 216 may be overwritten with results from processing of other work units 202, 206.

Figure 5:
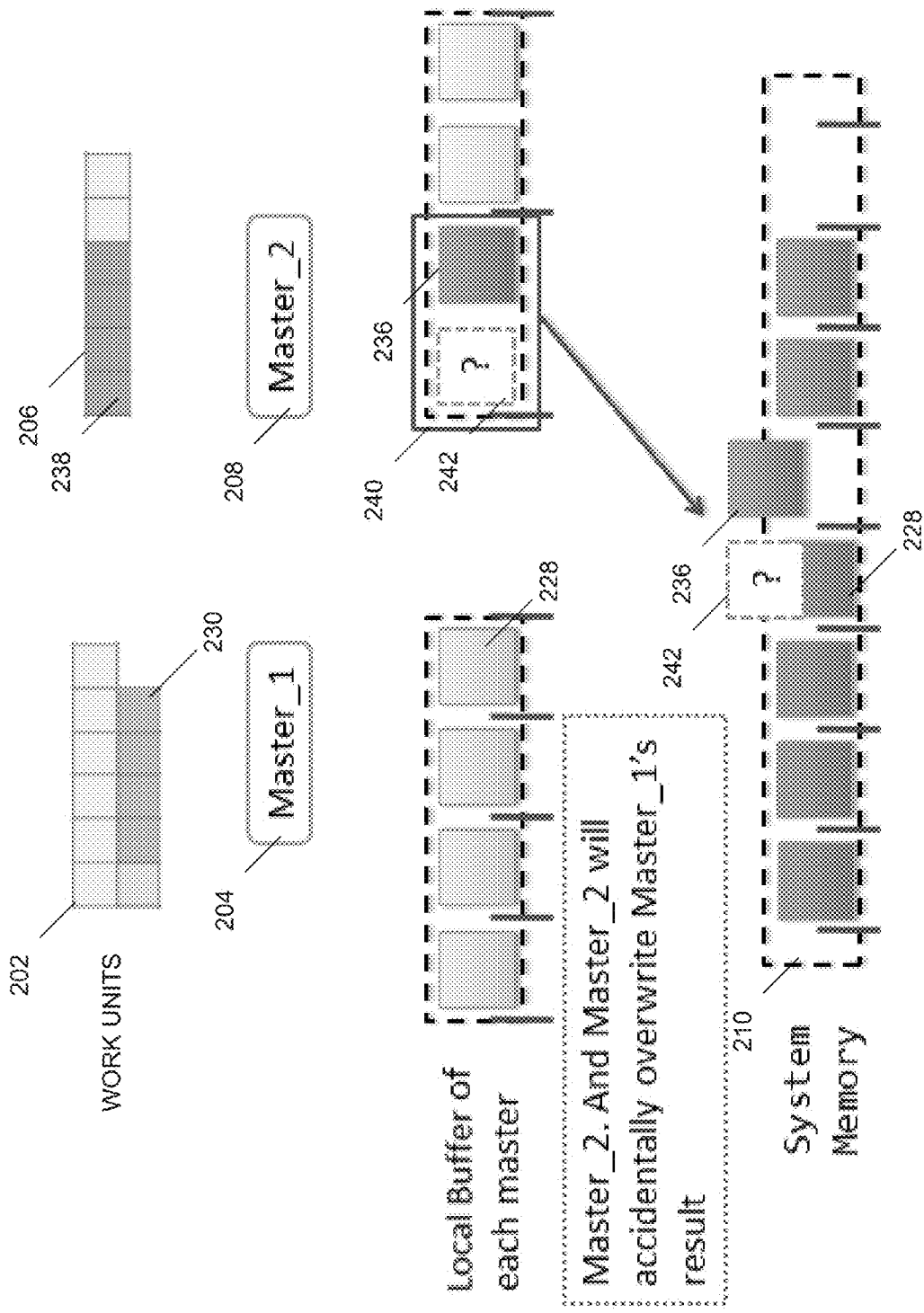

FIG. 5 depicts a results writing conflict that can result from sub-optimal assignment of work units to data processors. A result 228 from a last work unit 230 assigned to the first data processor 204 has been previously written to the system memory 210 by the first data processor 204. The second data processor 208 attempts to write a result 236 corresponding to a work unit 238 that immediately follows the last work unit 230 assigned to the first data processor 204. However, because the second data processor 208 is limited to transmitting a block of data 240 that is two cache lines in size, the second data processor 208 also writes one cache line of indeterminate data 242 that overwrites the previously written result 228 from the first data processor 204, creating an error in the results data contained in the system memory 210. While such a result could be avoided by having the first data processor 204 wait to write result 228 until after writing of the indeterminate result 242, such ordering adds additional complexity to the operations of the data processors 204, 208.

Figure 6:
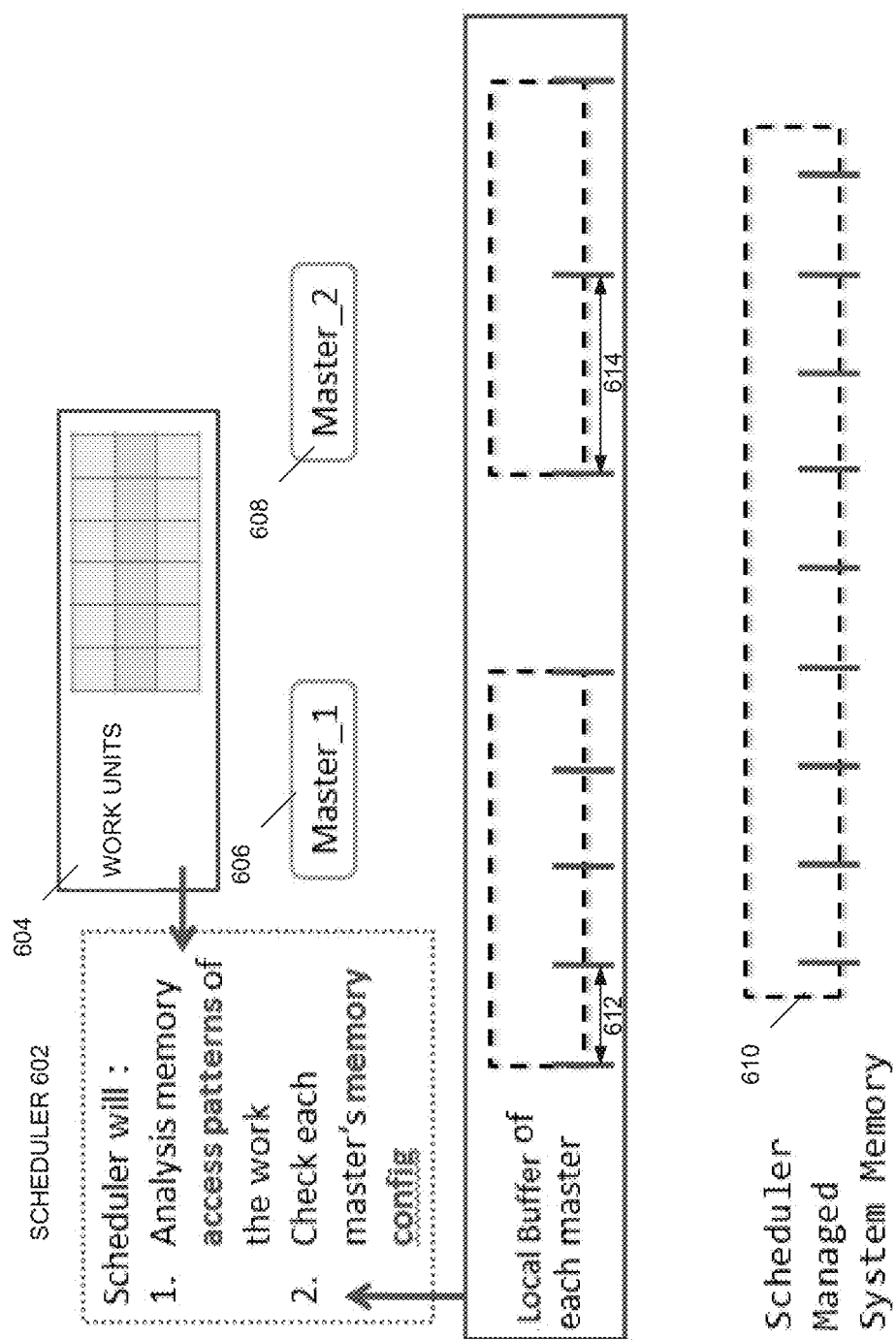
FIG. 6 is a block diagram depicting an example system for processing a computing task divided into a plurality of work units using a plurality of data processors that avoids the results writing conflict illustrated in FIGS. 2-5.

FIG. 6 is a block diagram depicting an example system for processing a computing task divided into a plurality of work units using a plurality of data processors that avoids the results writing conflict illustrated in FIGS. 2-5. In the example of FIG. 6, a scheduler 602 identifies a plurality of work units 604 of a computing task to be distributed among a plurality of data processors (Master_1, Master_2) 606, 608, where each of the data processors 606, 608 is configured to process work units and write results to a results writing portion of a system memory 610. In one example, the first data processor 606 is configured to write results to the system memory 610 in a first format (e.g., one cache line 612 at a time) while the second data processor 608 is configured to write results to the system memory 610 in a different, second format (e.g., two cache lines 614 at a time). The scheduler 602 is configured to assign work units to the first data processor 606 and the second data processor 608 so that a results writing conflict, such as the second data processor 608 writing results to the system memory 610 that overwrite results written to the system memory 610 by the first data processor 606, as described in FIGS. 2-5, is avoided. For example, the scheduler 602 may consider factors such as access patterns of the work units 604 and characteristics of the data processor 606, 608 memory configurations (e.g., the block sizes of data written to the system memory 610 at a time) in assigning work units 604 to the data processors 606, 608.

Figure 7:
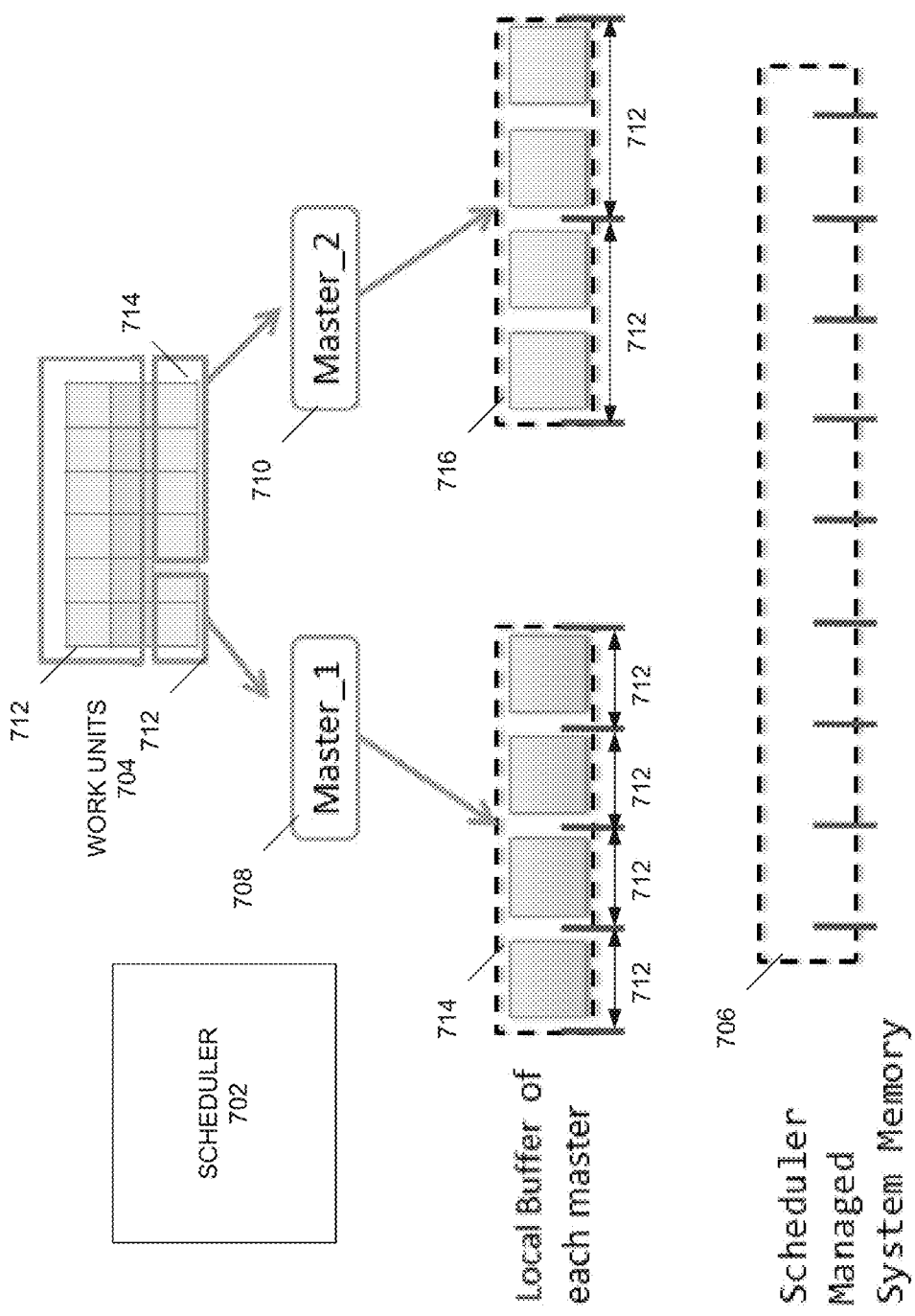
FIG. 7 depicts a scheduler assigning work units to a first data processor and a second data processor so as to prevent a results writing conflict where erroneous results are writing to a system memory.

FIG. 7 depicts a scheduler assigning work units to a first data processor and a second data processor so as to prevent a results writing conflict where good data written by a first processor is overwritten by undefined data from a second processor. A scheduler 702 receives an identification of a plurality of work units 704 of a computing task. The scheduler 702 receives access data related to the computing task, such as how the work units 704 are to be accessed and how results are to be written to a system memory 706. The scheduler 702 further receives data regarding characteristics of the data processors (Master_1, Master_2) 708, 710, such as the cache flushing characteristics of those data processors 708, 710 (e.g., that the second data processor 710 is configured to flush two cache lines of data to the system memory 706 at a time while the first data processor 708 is configured to flush one cache line at a time). Based on the received data, the scheduler 702 is configured to divide the work units 704 among the data processors 708, 710 (e.g., a first set of work units 712 to the first data processor 708 and a second set of work units 714 to the second data processor 710) and distribute the assigned work units 704 (e.g., in an order) such that results writing conflicts are guaranteed to be avoided.

Figure 8:
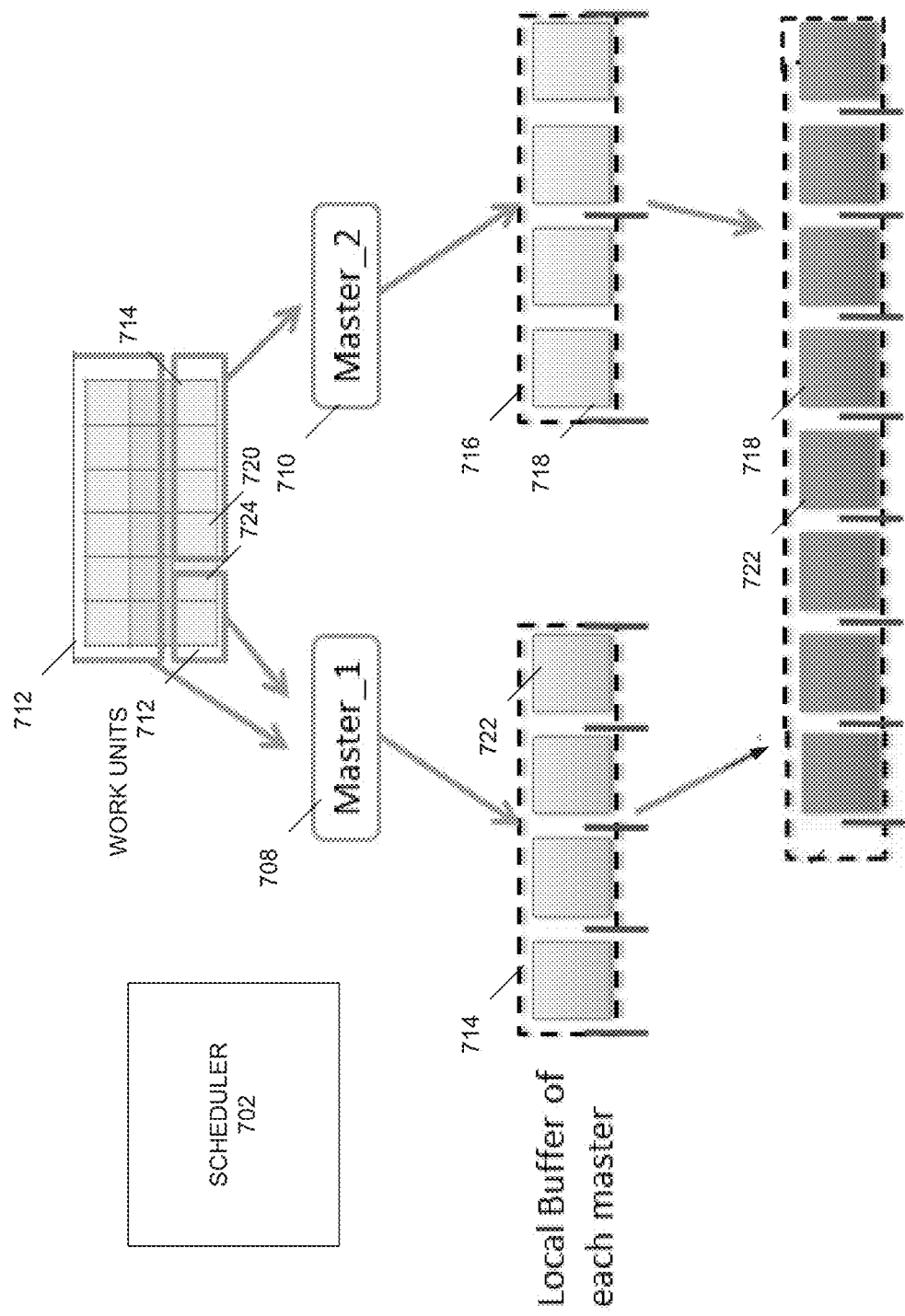
FIG. 8 depicts data processors writing data from their respective local buffers.

In the example of FIG. 7, a first set of work units 712 are assigned and distributed to the first data processor 708 and a second set of work units 714 are assigned and distributed to the second data processor 710 in a manner that guarantees that no results writing conflict will occur. Most notably, the scheduler 702 is configured to assign work units 704 to the data processors 708, 710 so that the blocks of data 712 (e.g., one cache line for the first data processor 708 and two cache lines for the second data processor 710) in the respective data buffers 714, 716 are filled with no overflow (e.g., when flush to system memory 706) so that no indeterminate data is present in a data block 712. FIG. 8 depicts the data processors 708, 710 writing data from their respective local buffers 714, 716. Because the scheduler 702 has assigned work units such that all of the data blocks of the local buffers 714, 716 are filled without any overflow, the local buffers 714, 716 contain no indeterminate data. When the second data processor 710 attempts to write results 718 from its first work unit 720 next to results 722 associated with the work unit 724 assigned to the first data processor 708, no undesirable overwriting occurs.

Figure 9:
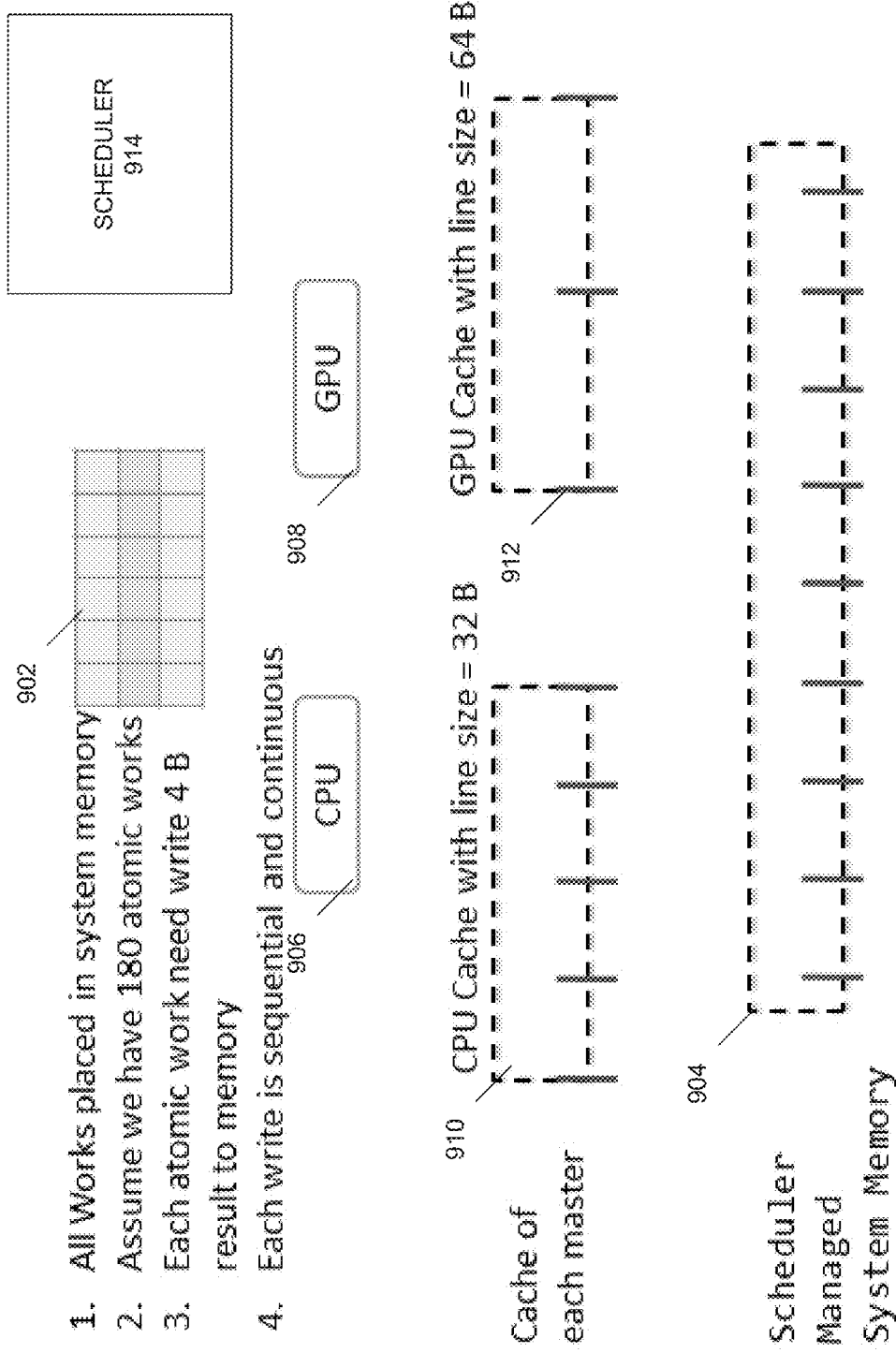

FIGS. 9-12 depict an example implementation of a scheduler for assigning work units to avoid a results writing conflict. In this example, a set of 180 work units of a computing task are placed into a work unit portion 902 of a system memory. The results of processing each work unit can be stored in four bytes of data, where each write is sequential and continuous. In the example of FIG. 9, a first data processor 906 is implemented as a central processing unit (CPU) while a second data processor 908 is implemented as a graphics processing unit (GPU). A cache 910 associated with the CPU 906 has 32 byte cache line sizes, where such cache lines are written to the system memory results storing portion 904 one cache line at a time. A cache 912 associated with the GPU 908 has 64 byte cache line sizes, where such cache lines are written to the system memory results storing portion 904 two cache lines at a time. A scheduler utilizes this configuration data to assign work units to the data processors 906 in a fashion that avoids results writing conflicts.

For example, FIG. 10 depicts an example algorithm for dividing the work units in the work unit portion 902 of the system memory. In a first step, the scheduler 914 determines a total number of bytes to be written for the 180 work units, 720 bytes. The scheduler 914 next determines a size of sub-groups to be assigned to a processing unit 906, 908 at a time. Because the scheduler 914 aims to assign work units so that cache lines (e.g., 32 bytes for the CPU 906 and 64 bytes for the GPU 908) are filled completely without any overflow, the scheduler 914 next determines a least common multiple of the CPU cache line size (32) and the GPU cache line size (64), where the least common multiple is 64. At step 3, the scheduler 914 determines a number of work units necessary to fill up a sub-group worth of bytes, where a sub-group worth of bytes (64) is divided by a number of bytes in a result from a single work unit (4) to identify that 16 work units will result in one sub-group worth of results bytes. In step 4, the scheduler determines that 11.25 sub-groups are present in the total computing task. The scheduler assigns approximately half of the sub-groups to the CPU and (5 sub-groups containing 16 work units each for a total of 80 work units) and the remainder of the work units (100 work units) to the GPU.

Figure 11:
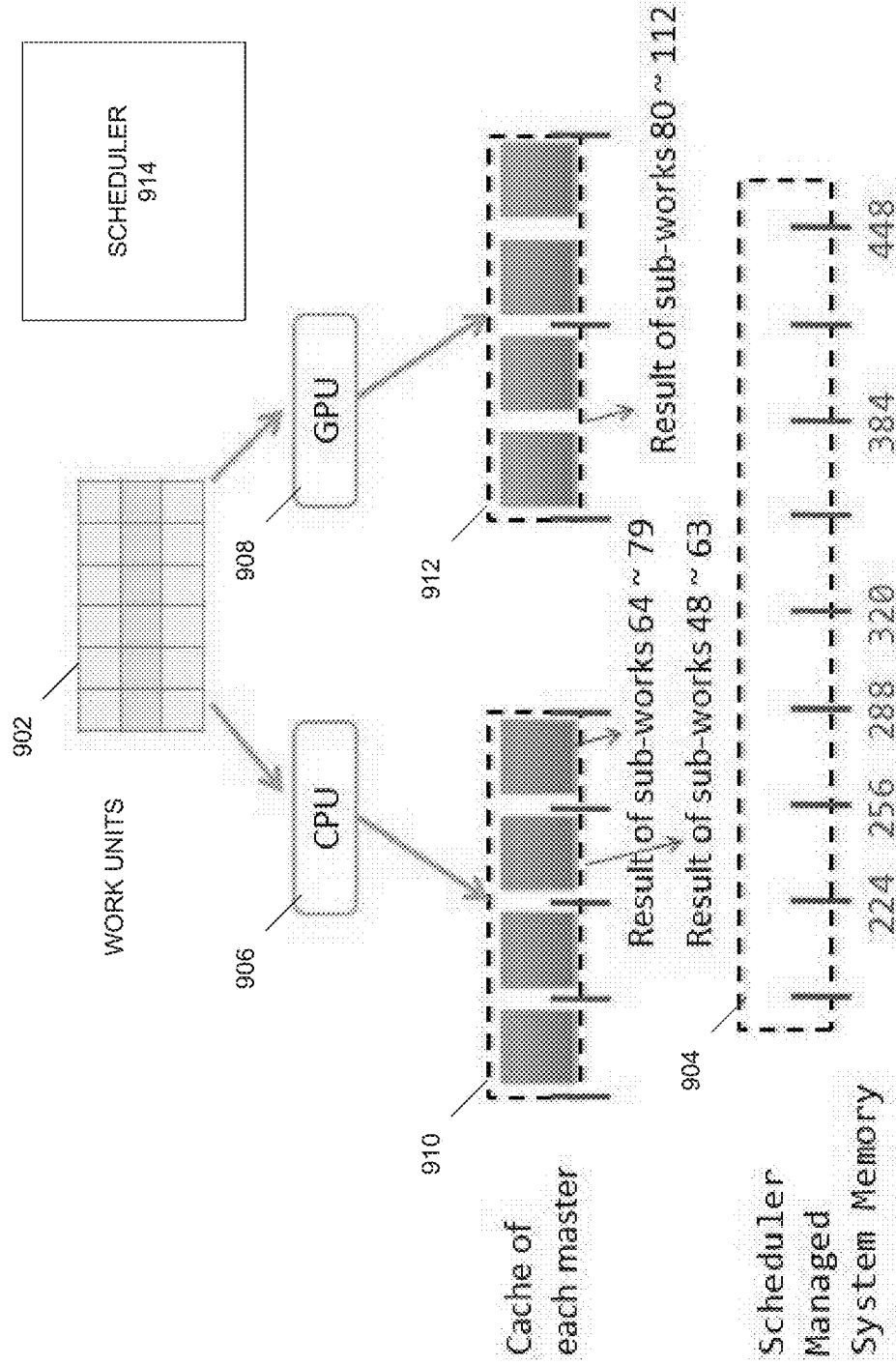
Figure 12:
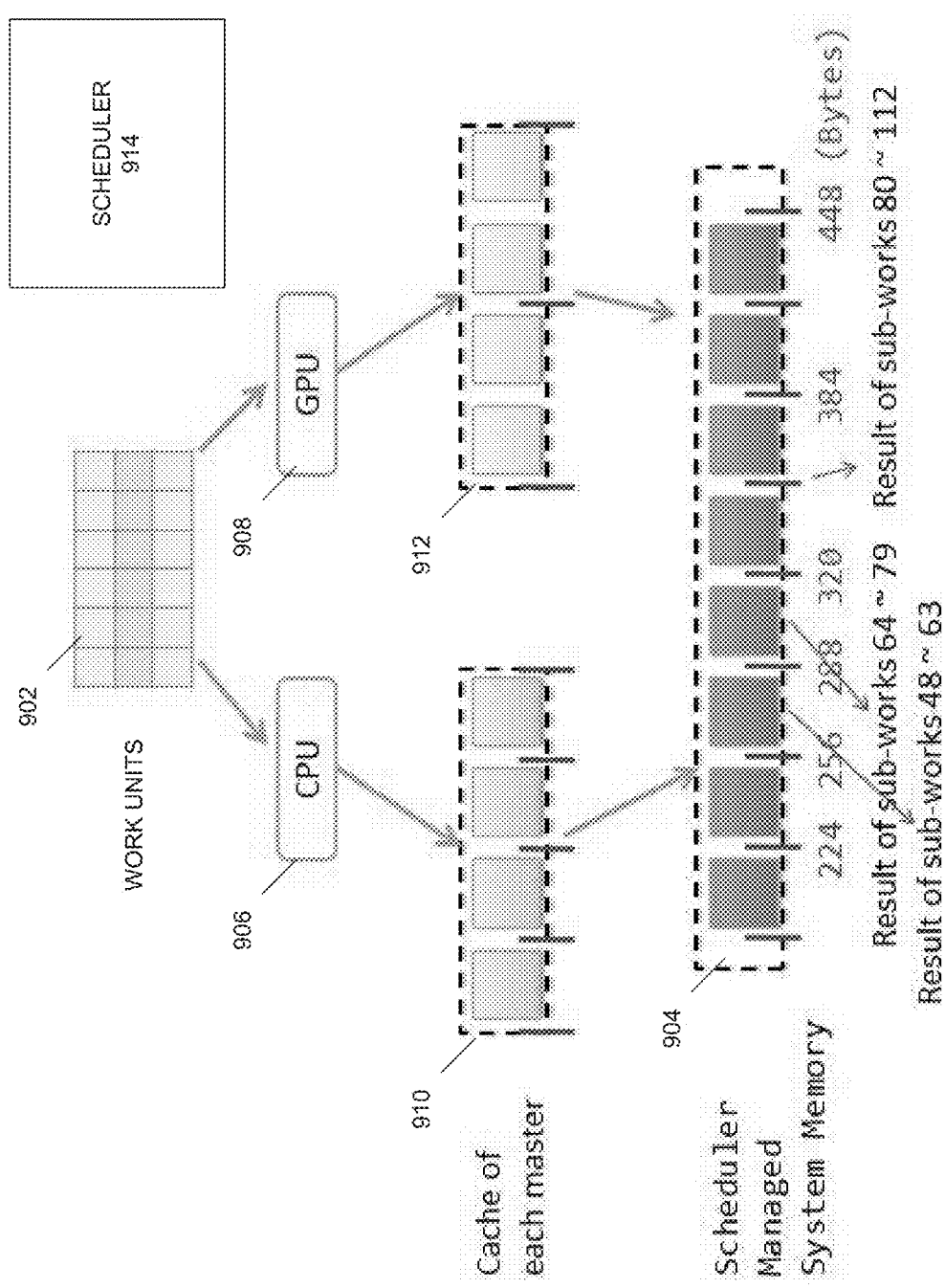

FIGS. 11 and 12 depict an example of the processing of work units in the example according to the direction of a scheduler 914. The 180 work units in the work unit portion 902 of a system memory of divided among the CPU 906 and the GPU 908. Sub-groups of 16 work units in size are assigned to the CPU 906 and the GPU 908 for processing. Because the sub-group sizes have been determined based on the individual characteristics of the data processor caches 910, 912 the assignment of sub-groups to the data processors 906, 908 is guaranteed to fill the data blocks completely, without overflow, preventing a results writing conflict, such as an data overwriting error, from occurring. FIG. 11 depicts the assignment of sub-groups to the data processors 906, 908, while FIG. 12 depicts the data processors 906, 908 writing results data to the results storing portion 904 of the system memory without error causing overlap.

Figure 13:
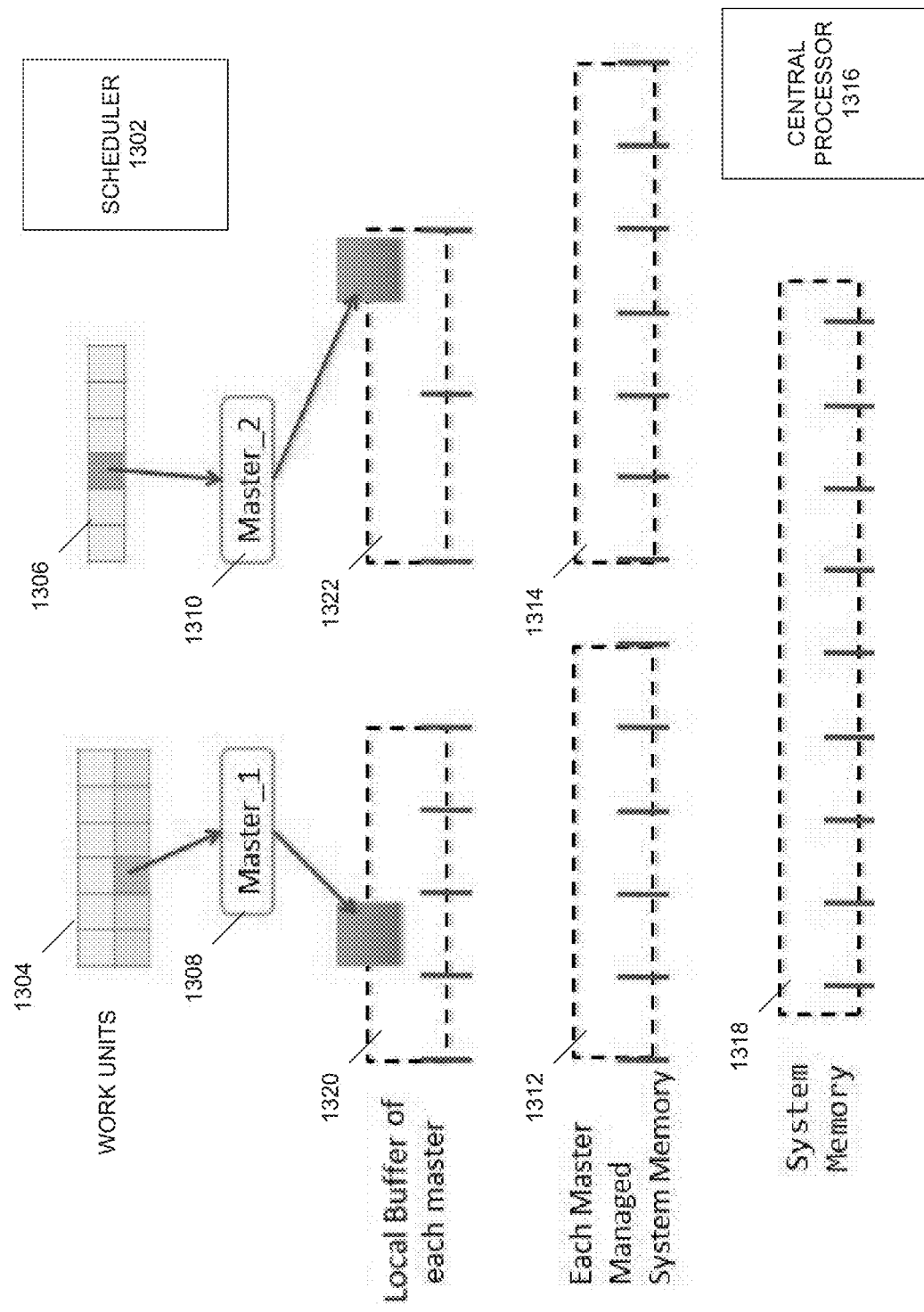
FIGS. 13 and 14 illustrate an example safety mode that is utilized when a scheduler is unable to guarantee the avoidance of a results writing conflict.
Figure 14:
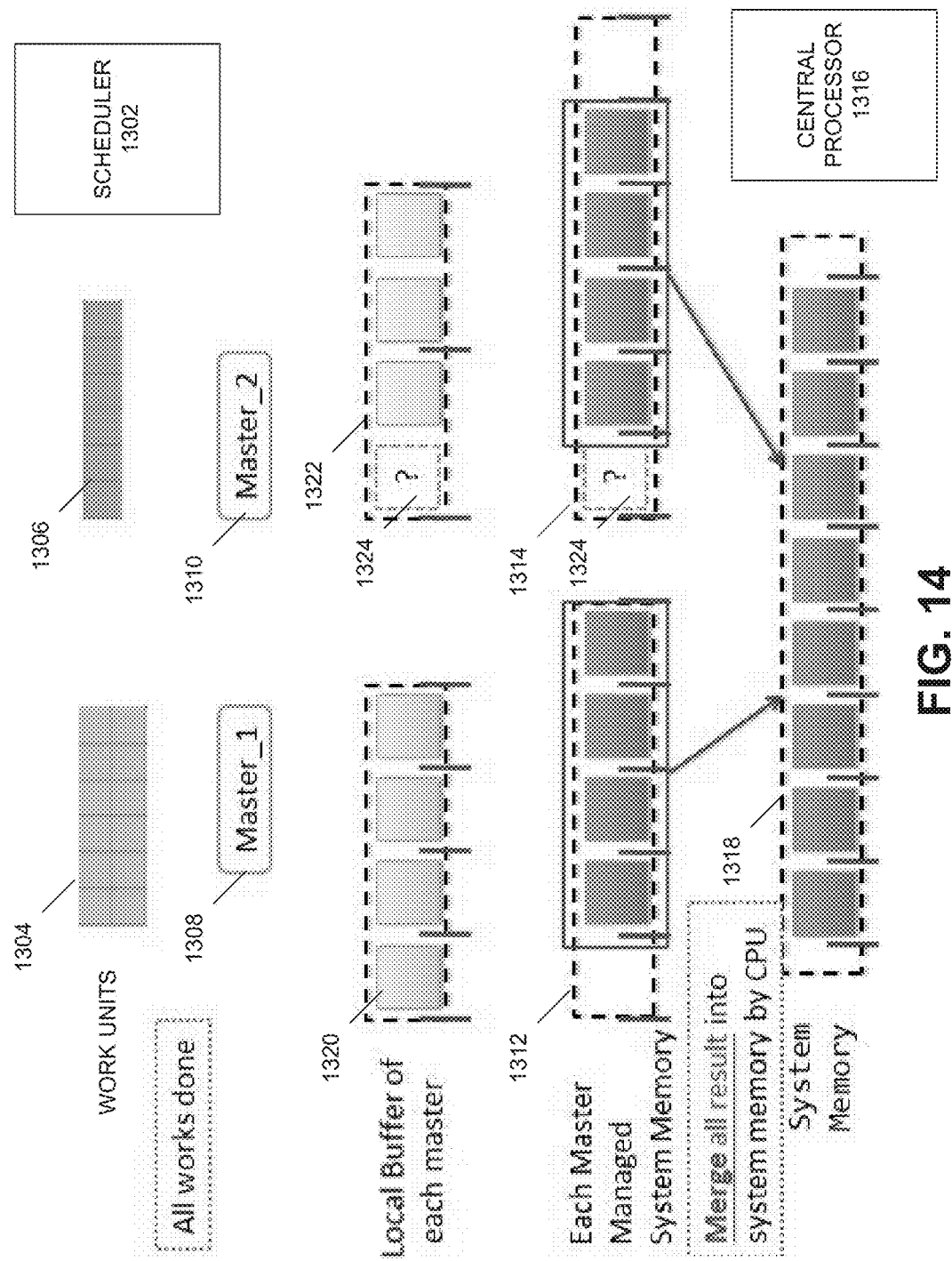

FIGS. 13 and 14 illustrate an example safety mode that is utilized when a scheduler is unable to guarantee the avoidance of a results writing conflict. As noted above, a scheduler 1302 seeks to assign work units 1304, 1306 to data processors 1308, 1310 in a manner that guarantees avoidance in results writing conflicts. In some instances, analysis of configuration data, such as memory access patterns of work units and data processor buffer memory configurations results in a determination that such guaranteed scheduling cannot be achieved. In such a scenario, a system may revert to a safety mode where prevention of such conflicts can be achieved, albeit at a higher resource cost.

In one embodiment, a safety mode utilizes additional buffer areas 1312, 1314 of the system memory to store a level of intermediate results before a central processor 1316 populates a results storing portion 1318 of the system memory. The scheduler 1302 directs the data processors to 1308, 1310 to access work units in a manner that does not necessarily guarantee avoidance of a results writing conflict. The data processors 1308, 1310 store results locally in respective local buffers 1320, 1322. As illustrated in FIG. 14, the processing of work units as directed by the scheduler results in what would be a results writing conflict without the additional controls of the example of FIGS. 13 and 14, where indeterminate data values 1324 are present in the local buffer 1322 of the second data processor 1310. In the safety mode, the data processors 1308, 1310 are instructed to write results from the local buffers 1320, 1322 to the respective buffer memory areas 1312, 1314 of the system memory instead of directly to the results storing portion 1318 of the system memory. Results originating from processing of work units are flagged by the data processors 1308, 1310 prior to writing to the buffer areas 1312, 1314 so that a central processor 1316 can combine the good results in the buffer areas 1312, 1314 of the system memory into the results storing portion 1318 of the system memory while excluding the indeterminate results 1324.

A scheduler can assign work units to data processors to avoid results writing conflicts in a variety of fashions. In one embodiment, as described with regard to the example of FIGS. 9-12, the scheduler is able to determine a plan for assigning work units based solely on consideration of characteristics of the computing task, work units, and the data processors. In another example, a scheduler develops a provisional assignment of work units, determines whether a potential results writing conflict exists, and then adjusts the provisional assignment of work units accordingly.

Figure 15:
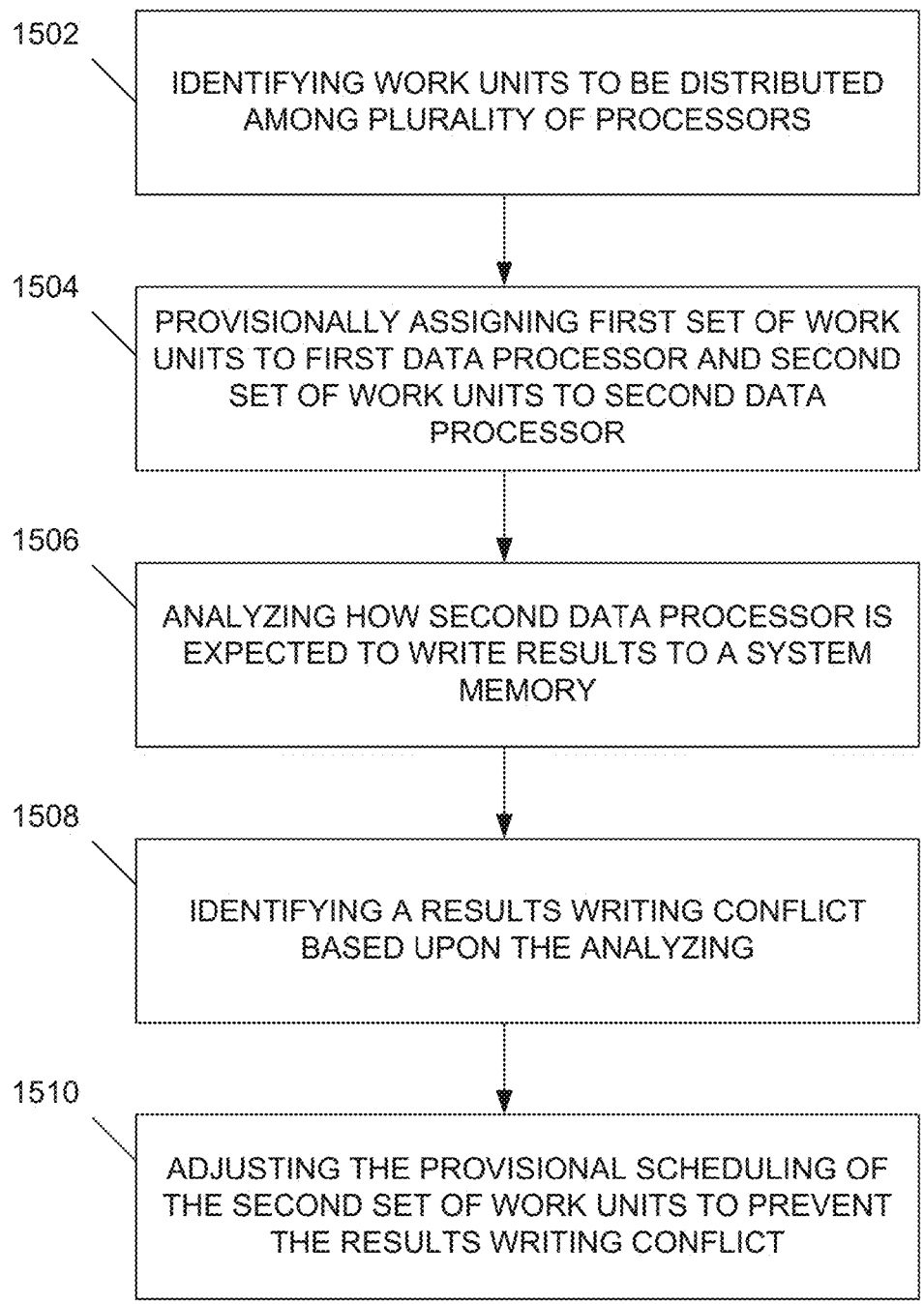
FIG. 15 is a flow diagram depicting an example processor-implemented method of distributing a computing task divided into a plurality of work units to multiple data processors.

FIG. 15 is a flow diagram depicting an example processor-implemented method of distributing a computing task divided into a plurality of work units to multiple data processors. At 1502, a plurality of work units of a computing task to be distributed among a plurality of data processors are identified, where each of the data processors are configured to process work units and write results to a results writing portion of a system memory, where the first data processor is configured to write results in a first format that is different from a second format that the second data processor is configured to use to write results to the system memory. At 1504, a scheduler provisionally assigns a first set of work units to a first data processor and a second set of work units to a second data processor. The scheduler then performs an analysis at 1506 to determine how the second data processor is expected to write results to the system memory. Such analysis can take a variety of forms, such as a simulation of calculation and results writing as depicted in the example of FIGS. 2-5. At 1508, a results writing conflict is identified based upon the analyzing, and at 1510 the provisional scheduling of the second set of work units is adjusted to prevent the results writing conflict. For example, work units may be added to or subtracted from the second set of work units to alleviate the conflict. The first set of work units are then dispatched to the first data processor, and the second set of work units are dispatched to the second data processor. Results from the first data processor and the second data processor are received and written to the system memory without conflict.

This application uses examples to illustrate the invention. The patentable scope of the invention includes other examples.

What is claimed is:

1. A system for processing a computing task that is divided into a plurality of discrete tasks, the system comprising:
   a system memory;
   a first data processor in communication with the system memory, wherein the first data processor is configured to
      process a first set of discrete tasks of the plurality of discrete tasks, and
      write, in accordance with a first format, a result associated with the processing of the first set of discrete tasks to the system memory;
   a second data processor in communication with the system memory, wherein the second data processor is configured to
      process a second set of discrete tasks of the plurality of discrete tasks, and
      write, in accordance with a second format, a result associated with the processing of the second set of discrete tasks to the system memory, wherein the second format is different from the first format; and
   a scheduler configured to assign, based on the second format being different from the first format, the first set of discrete tasks to the first data processor and the second set of discrete tasks to the second data processor so as to prevent
      (i) the result associated with the processing of the second set of discrete tasks being overwritten in the system memory by the result associated with the processing of the first set of discrete tasks; or
      (ii) the result associated with the processing of the first set of discrete tasks being overwritten in the system memory by the result associated with the processing of the second set of discrete tasks;
   wherein the scheduler is configured to, prior to the assigning, provisionally assign the first set of discrete tasks to the first data processor and the second set of discrete tasks to the second data processor, the scheduler being further configured to analyze how the second data processor is expected to write results to the system memory based on the second format and to identify a potential results writing conflict based on that analysis, the scheduler being further configured to adjust the provisional assigning of the second set of discrete tasks to prevent the potential results writing conflict;
   wherein the first data processor comprises a first local buffer, wherein the first local buffer is configured to write a first sized block of data to the system memory at a time;
   wherein the second data processor comprises a second local buffer, wherein the second local buffer is configured to write a second sized block of data to the system memory at a time, wherein the second sized block of data differs from the first sized block of data.

2. The system of claim 1, wherein the scheduler is further configured to identify the potential results writing conflict when the second processor writing the second sized block of data containing results from the second set of discrete tasks to the system memory would overwrite results written to the system memory by the first data processor.

3. The system of claim 1, wherein the first local buffer comprises a first cache that is configured to write a first number of cache lines to the system memory at a time;
   wherein the second local buffer comprises a second cache that is configured to write a second number of cache lines to the system memory at a time, wherein the second number of cache lines differs from the first number of cache lines.

4. The system of claim 3, wherein the second number of cache lines comprises multiple cache lines;
   wherein the second data processor is configured to write results from processing the second set of discrete tasks to the system memory adjacent to results from processing the first set of discrete tasks;
   wherein the results of processing the second set of discrete tasks provisionally assigned to the second data processor will not fill the second number of cache lines, the unfilled portion of the second number of cache lines containing indeterminate data;
   wherein writing the second number of cache lines to the system memory overwrites the results from processing the first set of discrete tasks in the system memory with the indeterminate data;
   wherein the scheduler is configured to identify a potential overwriting and adjusts the provisional scheduling of the second set of discrete tasks.

5. The system of claim 4, wherein the scheduler is configured to adjust the provisional scheduling assigning by adding discrete tasks to the second set of discrete tasks.

6. The system of claim 4, wherein the scheduler is configured to adjust the provisional scheduling assigning by removing discrete tasks from the second set of discrete tasks.

7. The system of claim 4, wherein the scheduler is configured to adjust the provisional scheduling assigning so that the results from processing the second set of discrete tasks completely fill a multiple of the second number of cache lines without overflow.

8. A system for processing a plurality of tasks, the system comprising:
    a first data processor configured to
        process a first set of tasks of the plurality of tasks, and
        write a result of the processing of the first set of tasks, to a system memory, in units of a first number of cache lines at a time;
    a second data processor configured to
        process a second set of tasks of the plurality of tasks, and
        write a result of the processing of the second set of tasks, to the system memory, in units of a second number of cache lines, different than the first number of cache lines; and
    a scheduler configured to avoid a potential result writing conflict due to the first number being different than the second number, by
        provisionally assigning the first set of tasks to the first data processor and the second set of tasks to the second data processor,
        analyzing how the second data processor is expected to write a result of the second set of tasks to the system memory to identify a potential result writing conflict, and
        in response to identifying the potential result writing conflict, adjusting the provisional assigning of the second set of tasks to the second data processor to prevent the potential results writing conflict;
    wherein the preventing of the potential result writing conflict prevents the result of processing of the second set of tasks from incompletely filling the second number of cache lines which would result in an unfilled portion of the second number of cache lines containing indeterminate data that would overwrite results from processing the first set of tasks.

9. A system for processing a plurality of tasks, the system comprising:
    a first processor configured to process tasks, store results of the processing in a first local buffer, and write contents of the first local buffer to a memory in units of blocks of a first block size;
    a second processor configured to process tasks, store results of the processing in a second local buffer, and write contents of the second local buffer to the memory in units of blocks of a second block size that is larger than the first block size; and
    a scheduler configured to, before the plurality of tasks is processed by the first processor and the second processor,
        analyze a provisional distribution of the plurality of tasks between the first processor and the second processor, in which a first set of the plurality of tasks is provisionally assigned to the first processor for processing to yield first results and a second set of the tasks is provisionally assigned to the second processor for processing to yield second results,
        determine that the provisional distribution will result in a block, that is written from the second local buffer to the memory, being only partially filled with the second results, and
        in response to the determination, adjust the provisional distribution of the plurality of tasks between the first processor and the second processor to avoid a potential result writing conflict due to the first block size being different than the second block size.

10. The system of claim 9, wherein the adjusting of the provisional distribution includes adding tasks to the second set.

11. The system of claim 9, wherein the adjusting of the provisional distribution includes removing tasks from the second set.

12. The system of claim 9, wherein the first processor is a central processing unit and the second processor is a graphics processing unit.

* * * * *